United States Patent [19]

Chapman et al.

[11] 4,294,561

[45] Oct. 13, 1981

[54] JOINTING MEMBER FOR FRAME SYSTEMS

[75] Inventors: Arthur J. Chapman, Reading; Geoffrey M. G. Hayes, Weybridge, both of England

[73] Assignee: Pentabloc, Ltd., London, England

[21] Appl. No.: 111,675

[22] Filed: Jan. 14, 1980

[51] Int. Cl.³ .............................................. F16B 7/04
[52] U.S. Cl. ...................................... 403/219; 403/400
[58] Field of Search ...................... 403/218, 219, 400

[56] References Cited

U.S. PATENT DOCUMENTS

| | | | |
|---|---|---|---|
| 3,195,938 | 7/1965 | Rifkin | 403/218 |
| 3,272,540 | 9/1966 | Glauzer | 403/218 |
| 4,066,371 | 1/1978 | Chapman | 403/218 |

FOREIGN PATENT DOCUMENTS 386230  4/1965  Switzerland ........................ 403/400

*Primary Examiner*—Andrew V. Kundrat
*Attorney, Agent, or Firm*—Charles E. Temko

[57] ABSTRACT

A jointing member for a frame system has three bores therein with the axis of the bores mutually perpendicular and with two of the bores lying in the same plane. The bores are so interconnected within the member that tightening securing means, such as a set screw, for an elongate member inserted in one of the bores pushes that elongate member sideways to cause it to bind against elongate members inserted into the other two bores to secure them therein also. Preferably the jointing member is of cuboid shape and the elongate members are of square or circular section.

10 Claims, 9 Drawing Figures

JOINTING MEMBER FOR FRAME SYSTEMS

BACKGROUND OF THE INVENTION

The invention relates to jointing members for frame systems. The invention has particular though not exclusive application to the jointing together of elongate members, such as rods or tubes, to form frameworks for supporting goods for display.

SUMMARY OF THE INVENTION

The invention has among its objects to provide a jointing member for a frame system which can be inexpensively produced and in operation can receive elongate members which can be securely held therein by rapid securing means.

According to the invention a jointing member for a frame system comprises a member having three bores therein with the axes of the bores mutually perpendicular and with two of said bores lying in the same plane, and securing means for securing an elongate member engaged in one of said bores against longitudinal movement with respect to said member, said bores being so interconnected within said member that tightening said securing means to secure an elongate member in said one of said bores will secure respective elongate members engaged in the others of said bores against longitudinal movement with respect to said member.

Preferably said one of said bores is not one of the two bores lying in the same plane. The securing means is preferably a set screw engaged in a screw threaded hole in said member and engageable, by screwing it inwardly, with the elongate member engaged in said one of said bores, to press that elongate member against the elongate members engaged in said others of said bores to bind them therein.

Preferably one of said two bores is a blind bore.

Said one bore is preferably oversize compared with the other bores and the elongate member to engage therein, but is preferably only oversize in the direction of an axis which bisects the angle which said two of the bores make with one another.

A collar is advantageously provided to surround the portion of the elongate member engaged in said one of the bores, the collar having projections thereon to engage the elongate members engaged in said others of the bores. Tightening said set screw causes the elongate member engaged in said one of the bores to press the collar towards the elongate members engaged in said others of the bores to press the projections into the surfaces of the elongate members in the others of said bores to provide positive engagement therewith.

Preferably the collar is formed as a stamping of tempered steel and comprises a flat strip of steel with dimples pressed thereinto to form the projections and has cut-away portions at its ends such that, when the flat strip is rolled into a collar, the cut-away portions define an aperture through which the set screw can pass to engage the elongate member which is surrounded by the collar. The set screw preferably has a hexagonal recess in its head whereby it can readily be tightened by a key.

The jointing member of the invention can be used to make a variety of connections, for example an L-shaped connection between two elongate members or a T-shaped connection between two elongate members, in each of these connections one of the bores being filled with a blank. By using three elongate members and with the elongate member in said one of the bores in a vertical orientation, a side outlet elbow or side outlet T can be formed.

The jointing member is particularly suitable for use in display stands, hanging rails, for example for display of clothing, or room dividers and has particular application to the do-it-yourself market since the only tools required to form a framework are a key for tightening the set screw and a saw for cutting the elongate members to required lengths. Since two of the elongate members can be secured to extend in the same plane, the jointing member and elongate members secured thereby are particularly suitable for securing shelving, particularly glass shelving.

BRIEF DESCRIPTION OF THE DRAWINGS

The invention is diagrammatically illustrated by way of example in the accompanying drawings, in which.

DETAILED DESCRIPTION OF THE DISCLOSED EMBODIMENT

Figure 1:
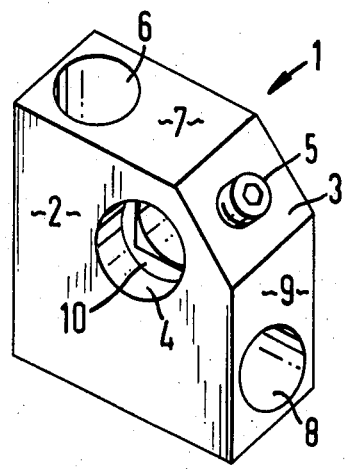
FIG. 1 is a perspective view of a first embodiment of a jointing member for a frame system according to the invention.
Figure 2:
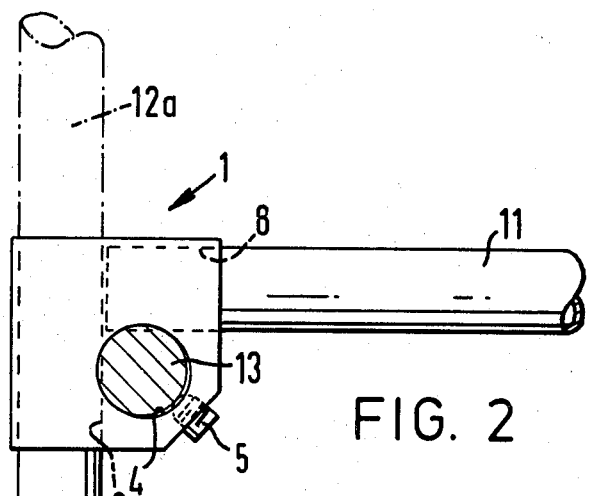
FIG. 2 shows the jointing member of FIG. 1 with elongate members engaged therein.
Figure 3:
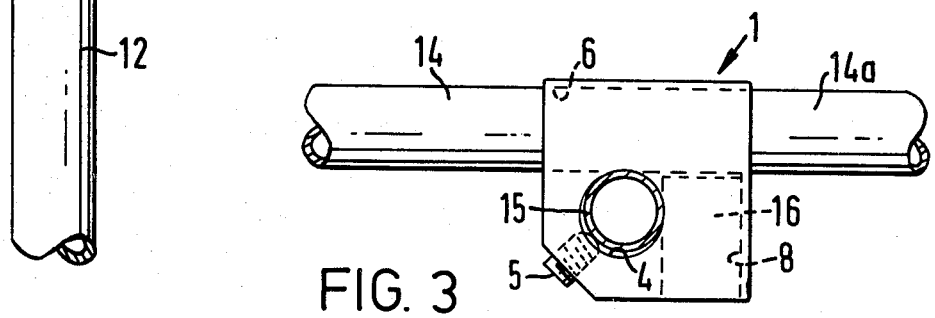
FIG. 3 shows the jointing member of FIG. 1 with elongate members engaged therein in another configuration compared with FIG. 2.

Referring to the drawings and firstly to FIGS. 1 to 3, a jointing member for a frame system comprises a block 1 having opposite side faces 2 which are generally square but have one corner removed to form a 45° edge face 3. The block 1 has a thickness slightly less than half the edge-dimension of the square faces 2. Preferably the block 1 is a metal casting, advantageously a die-casting or a plastic moulding, for example injection moulded nylon.

A circular section through-bore 4 with its axis perpendicular to the planes of the faces 2 is in communication with the inner end of a set screw 5 engaged in a screw threaded aperture in the face 3. A circular section bore 6 in a face 7, the upper edge face in the orientation shown in FIG. 1, is a through-bore with its axis perpendicular to the plane of the face 7. A circular section bore 8 in a face 9, the front edge face in the orientation shown in FIG. 1, is a blind bore, that is to say, it extends only as far as its intersection with the bore 6, the rear edge face in the orientation shown in FIG. 1 being plain, that is to say, not having an aperture therein communicating with the bore 8. The bores 4, 6 and 8 just intersect one another within the block 1 as can be seen in FIG. 1 where an arcuate slot 10 is shown through which the bores 4, 6 and 8 communicate. The extent of intersection is such that tubular or solid elongate members can be engaged in the bores 4, 6 and 8 as sliding clearance fits therein but tightening of the set screw 5 presses the elongate member engaged in the bore 4 along the bisector of the 90° angle between the axes of the bores 6 and 8 to press the elongate member in the bore 4 into engagement, through the slot 10, with the elongate members in the bores 6 and 8 to bind them in the bores and secure all three elongate members against longitudinal movement in their respective bores. The bore 4 is preferably not circular but rather is elongate in the direction of said bisector to allow movement of the elongate member therein under the force applied by the set screw 5.

Referring to FIG. 2, a simple L-shaped connection can be made between an elongate member 11 engaged in the bore 8 and an elongate member 12 engaged in the bore 6. A blank elongate member 13 comprising a piece of cylindrical rod of the same diameter as the elongate members 11 and 12 and of a length equal to the thickness of the block 1 is engaged in the bore 4 and is pressed by the screw 5 into engagement, through the slot 10, with the elongate members 11 and 12 to secure them. Obviously the configuration of FIG. 2 can be used in any orientation for example with the elongate members 11 and 12 both in the same horizontal plane or with one or other of them in a vertical orientation. The L-shaped arrangement of FIG. 2 can be converted to a T-shaped arrangement by allowing the elongate member 12 to extend right through the block 1 that is to say to have a length 12a, shown in chain dotted lines, extending from the block 1.

In the arrangement of FIG. 3 an elongate member 14 extends right through the bore 6 with a portion 14a extending out of the other side, an elongate member 15 extends perpendicular to the elongate member 14, 14a to form a cross-over arrangement and a blank elongate member 16 is provided in the bore 8.

Figure 4:
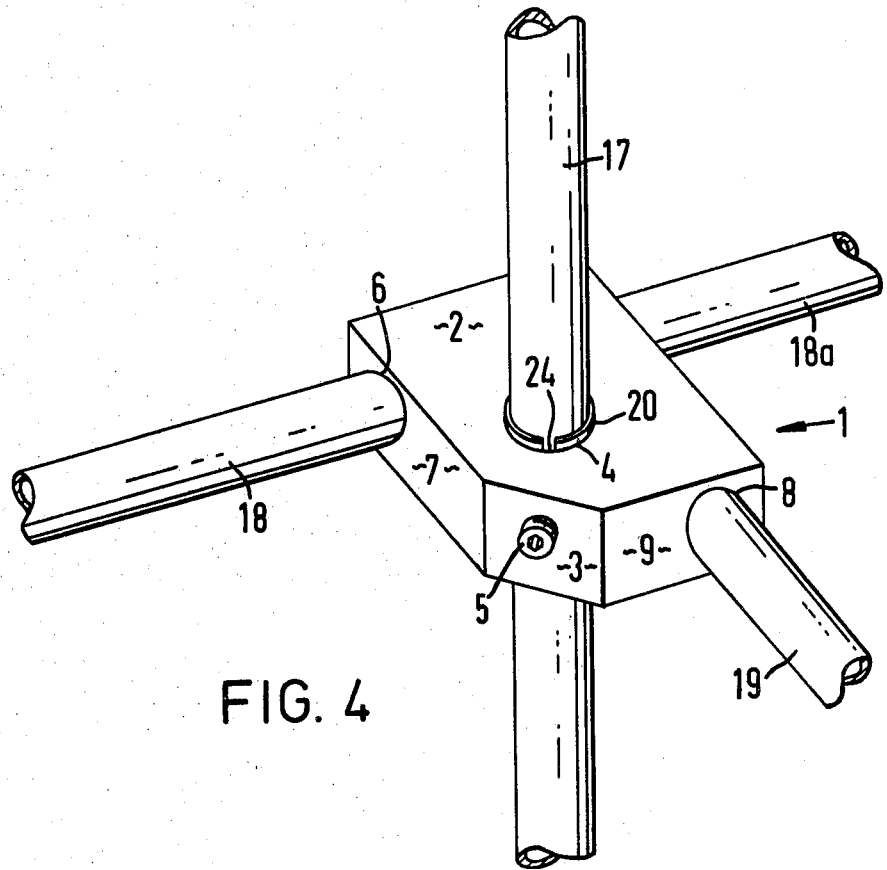
FIG. 4 shows a slightly modified second embodiment of the jointing means of FIG. 1.

In the embodiment of FIG. 4, an elongate member 17 in the bore 4 is vertical an elongate member 18 in the bore 6 preferably has a projecting portion 18a beyond the block 1 and is horizontal and an elongate member 19 in the bore 8 is also horizontal. The configuration of FIG. 4 is particularly suitable for forming a frame for display purposes with glass shelves resting on the horizontal members 18, 18a and 19. By inverting the block 1 and thereby changing over the positions of the bores 6 and 8, an arrangement can be obtained wherein effectively an elongate member in the position of the elongate member 19 of FIG. 4 can have an extension beyond the block 1 and the member in a position of elongate member 18 of FIG. 4 does not have an extension beyond the block 1. Thus a side outlet elbow or a side outlet T can be formed.

Figure 5A:
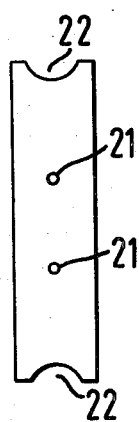
FIGS. 5a, 5b and 5c respectively show a blank for a collar, used in the embodiment shown in FIG. 4, an end view of the collar and a perspective view of the collar.
Figure 5B:
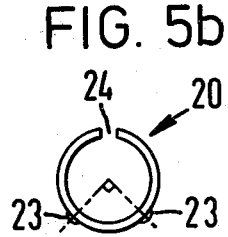
Figure 5C:
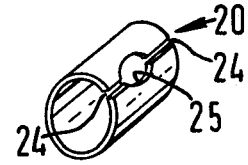

FIG. 4 also shows a collar 20 in the bore 4 around the elongate member 17. If such a collar 20 is provided then the bore 4 is provided oversize to accommodate it. One embodiment of the collar 20 is shown in FIGS. 5b and 5c. FIG. 5a shows a blank from which the collar 20 is formed, the blank comprising a rectangular strip of tempered sheet steel with two dimples 21 pressed therein and with cut-away portions 22 in the ends. After forming the dimples 21 and the recesses 22, the rectangular strip is rolled to the configuration of FIGS. 5b and 5c, FIG. 5b showing that projections 23 formed by the dimples 21 project outwardly at opposite ends of a 90° arc symmetrical with a gap 24 between the ends of the rolled strip and FIG. 5 showing that the recesses 22 form an aperture 25 at the joint 24.

Before the elongate member 17 is inserted in the bore 4, the collar 20 is squeezed to close the gap 24 and inserted in the bore 4 with the aperture 25 aligned with the inner end of the screw 5. The collar 20 is then allowed to expand to engage the projections 23 in the arcuate slot 10. The elongate member 17 is then slid through the bore of the collar 20. When the set screw 5 is tightened it will pass through the aperture 25 in the collar 20 and engage the elongate member 17 and cause the elongate member 17 to press the projections 23 of the collar 20 into the material of the elongate members 18 and 19 to give a very secure holding connection.

In one embodiment, for use with 1.4 cm diameter chromium plated steel tubes as elongate members, the block 1 had its faces 2 of 3.4 cm edge, the width of the faces 7 and 9 was 1.5 cm and the length of the 45° angled face 3 was 1.2 cm. The block 1 was die-cast from an aluminum alloy and subsequently anodised. For such an arrangement it was found that the collar 20 was not required but the collar 20 was desirable for systems using larger diameter elongate members.

Figure 6:
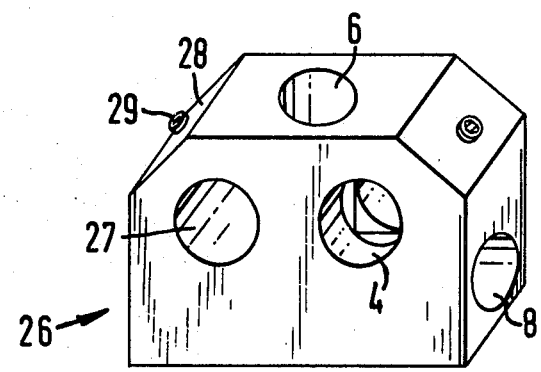
FIG. 6 shows a third embodiment of a jointing member for a frame system according to the invention.

The jointing member 26 of FIG. 6 is similar to the jointing member 1 of FIG. 1 but is somewhat wider and includes a bore 27 additional to the bores 4, 6 and 8, and a second angled edge face 28 with a second set screw 29 therein. The bore 27 which extends parallel to the bore 4 improves the versatility of the jointing member and allows more complex frame systems to be formed. The bores 4, 6 and 8 are preferably all through bores.

Figure 7:
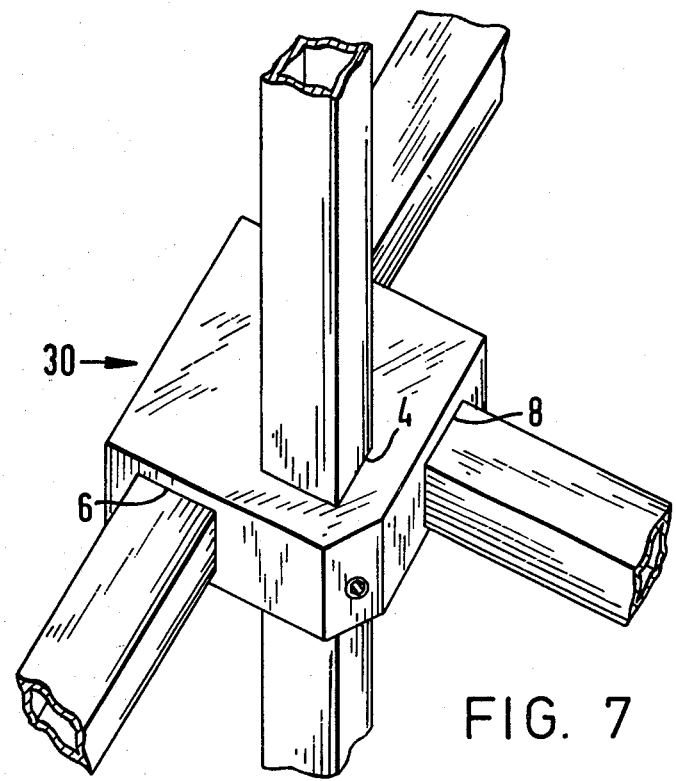
FIG. 7 shows a fourth embodiment of a jointing member for a frame system according to the invention.

The jointing member 30 of FIG. 7 is formed by injection moulding from nylon or a similar plastic material and differs from the other embodiments illustrated in that it has the bores 4, 6 and 8 of square section to receive square section elongate members, the bore 8 preferably being a blind bore.

The square section elongated members engaged in the bores are preferably chromium plated steel tubes which, with jointing members 30 of different colored plastic material can form very attractive frame systems.

Although generally cuboid jointing members are shown in the drawings the jointing members may, within the scope of the invention as defined by the appended claims, vary widely therefrom, generally spherical jointing members being particularly attractive in appearance.

What is claimed is:

1. A jointing member for a frame system comprising: a member having three bores therein with the axes of said bores mutually perpendicular and with two of said bores lying in the same plane, and securing means for securing an elongate member engaged in one of said bores against longitudinal movement with respect to said member, said bores being so interconnected within said member that tightening said securing means to secure an elongate member in one of said bores, said one of said bores being other than one of said two bores lying in said plane, will secure respective elongate members engaged in the others of said bores against longitudinal movement with respect to said member; wherein said securing means is a set screw engaged in a screw-threaded hole in said member and engageable, by screwing it inwardly, with the elongated member engaged in said one of said bores, to press that elongate member against the elongate members engaged in said others of said bores to bind them therein, and wherein one of said two bores lying in the same plane is a blind bore.

2. A jointing member as claimed in claim 1, wherein said one of said bores is oversize compared with said two bores lying in the same plane in the direction of an axis which bisects the angle which said two of said bores lying in the same plane make with one another.

3. A jointing member as claimed in claim 2, further comprising a collar surrounding the portion of an elongate member engaged in said one of said bores, said collar having projections thereon to engage elongate members engaged in said others of said bores.

4. A jointing member as claimed in claim 3, wherein tightening of said set screw causes an elongate member engaged in said one of said bores to press said collar toward enlongate members engaged in said others of said bores to press said projections into the surfaces of the elongate members in said others of said bores to provide positive engagement therewith.

5. A jointing member as claimed in claim 4, wherein said collar is formed as a stamping of tempered steel and comprises a flat strip of steel with dimples pressed thereinto to form said projections and has cut-away portions at its ends whereby, when said flat strip is rolled to form said collar, said cut-away portions define an aperture through which said set screw can pass to engage said collar.

6. A jointing member as claimed in claim 1, further comprising: said member having a fourth bore therein, extending parallel to said one of said bores and further securing means to secure an elongate member in said fourth bore.

7. A jointing member for a frame system comprising: a member having three bores therein with the axes of said bores mutually perpendicular and with two of said bores lying in the same plane; securing means for securing an elongate member engaged in one of said bores against longitudinal movement with respect to said member, said bores being so interconnected within said member that tightening said securing means to secure an elongate member in said one of said bores, in which said one of said bores is other than one of the two of said bores lying in the same plane, will secure respective elongate members engaged in the other of said bores against longitudinal movement with respect to said member; wherein said securing means is a set screw engaged in a screw-threaded hole in said member and engageable, by screwing it inwardly, with the elongate member engaged in said one of said bores, to press that elongate member against the elongate members engaged in said others of said bores to bind them therein; said one of said bores being oversize compared with said two bores lying in the same plane in the direction of an axis which bisects the angle which said two of said bores lying in the same plane make with one another; and a collar surrounding the portion of an elongate member engaged in said one of said bores, said collar having projections thereon to engage elongate members engaged in said other of said bores.

8. A jointing member as claimed in claim 7, wherein tightening said set screw causes an elongate member engaged in said one of said bores to press said collar toward elongate members engaged in said others of said bores to press said projections into the surfaces of the elongate members in said others of said bores to provide positive engagement therewith.

9. A jointing member as claimed in claim 8, wherein said collar is formed as a stamping of tempered steel and comprises: a flat strip of steel with dimples pressed thereinto to form said projections and has cut-away portions at its ends whereby, when said flat strip is rolled to form said collar, said cut-away portions define an aperture through which said set screw can pass to engage said collar.

10. A jointing member as claimed in claim 7, further comprising said member having a fourth bore therein extending parallel to said one of said bores and further securing means to secure an elongate member in said fourth bore.

* * * * *